US007576464B2

(12) United States Patent
Dittenhöfer et al.

(10) Patent No.: US 7,576,464 B2
(45) Date of Patent: Aug. 18, 2009

(54) DIRECT DRIVE FOR A PRINTING MACHINE

(75) Inventors: Thomas Dittenhöfer, Riedbach (DE); Stephan Popp, Emskirchen (DE); Günter Schmid, Nürnberg (DE); Detlef Rode, Reurieth (DE); Jürgen Weyh, Viernau (DE); Karl Schäfer, Kürnech (DE)

(73) Assignee: Schaeffler KG, Herzogenaurach (DE)

( * ) Notice: Subject to any disclaimer, the term of this patent is extended or adjusted under 35 U.S.C. 154(b) by 396 days.

(21) Appl. No.: 11/581,107

(22) Filed: Oct. 13, 2006

(65) Prior Publication Data

US 2007/0090721 A1 Apr. 26, 2007

(30) Foreign Application Priority Data

Oct. 20, 2005 (DE) ...................... 10 2005 050 651

(51) Int. Cl.
*H02K 49/00* (2006.01)

(52) U.S. Cl. ........................................................ 310/99

(58) Field of Classification Search ................. 310/195, 310/99, 258, 209

See application file for complete search history.

(56) References Cited

U.S. PATENT DOCUMENTS

| | | | | |
|---|---|---|---|---|
| 2,922,098 | A | 1/1960 | Hutson | |
| 3,090,879 | A | 5/1963 | Lohest | |
| 3,460,016 | A | 8/1969 | Rouverol | |
| 5,115,738 | A * | 5/1992 | Grutzmacher et al. | 101/216 |
| 5,771,805 | A * | 6/1998 | Branas et al. | 101/248 |

FOREIGN PATENT DOCUMENTS

| | | |
|---|---|---|
| BE | 495589 | 5/1950 |
| DE | 298 23 527 U 1 | 4/1998 |
| DE | 199 30 998 A 1 | 7/1999 |
| DE | 102 19 903 A 1 | 5/2002 |
| DE | 102 55 041 A 1 | 11/2002 |
| EP | 0 689 277 A2 | 6/1995 |
| EP | 1 277 575 B1 | 8/1995 |
| WO | WO 02/081213 A2 | 10/2002 |
| WO | WO 2005/056195 A1 | 6/2005 |

* cited by examiner

*Primary Examiner*—Javaid Nasri
(74) *Attorney, Agent, or Firm*—Charles A. Muserlian

(57) ABSTRACT

A device for driving a cylinder (1) of a printing machine has an electric motor (3) whose rotor (14) is arranged coaxially with respect to the cylinder (1) and is firmly connected so as to rotate with the latter, and whose stator (15) is held on a frame construction (2) in which the cylinder (1) is mounted such that it can be displaced axially. The rotor (14) and the stator (15) are dimensioned and coupled to the cylinder (1) and the frame construction (2), respectively, in such a way that during any axial displacement of the cylinder (1) possible during the operation of the printing machine, the gap (16) formed between stator (15) and rotor (14) remains constant both with regard to gap width (s) and with regard to length.

13 Claims, 9 Drawing Sheets

DIRECT DRIVE FOR A PRINTING MACHINE

FIELD OF THE INVENTION

The invention relates to a device for driving a cylinder of a printing machine, having an electric motor whose rotor is arranged coaxially with respect to the cylinder of the printing machine and is firmly connected so as to rotate with the latter, and whose stator is held on a frame construction in which the cylinder is mounted such that it can be displaced axially. A device of this type is known, for example from DE 102 19 903 A1.

BACKGROUND OF THE INVENTION

A further printing machine drive, known from EP 1 277 575 B1, is part of an offset printing machine which has at least one press unit with at least one form cylinder and a transfer cylinder, it being possible for the ability to laterally displace the form cylinder to be provided. Since the rotor of the electric motor driving the form cylinder directly is rigidly connected to the form cylinder and is thus displaced together with the latter during its lateral, that is to say axial, displacement, while the stator of the motor is in a fixed location, a change in the output data of the electric motor in the event of an axial displacement of the form cylinder is to be assumed.

OBJECT OF THE INVENTION

The invention is based on the object of specifying an electric direct drive for a cylinder of a printing machine in which there is an at most slight dependence between the axial position of the cylinder and the properties of the electric drive.

SUMMARY OF THE INVENTION

According to the invention, this object is achieved by a device for driving a cylinder of a printing machine having the features of claim 1. This device is an electric direct drive having an electric motor, whose rotor is arranged such that it cannot rotate relative to the cylinder of the printing machine and coaxially with respect to said cylinder. The stator of the electric motor is held on a frame construction of the printing machine, the cylinder being mounted such that it can be displaced axially in the frame construction. The gap formed between rotor and stator is constant both with regard to the gap width and with regard to the length measured in the axial direction of the cylinder in any position of the cylinder that is possible in the proper operation of the printing machine. This is achieved by means of the geometry of stator and rotor and/or by means of the manner of the coupling of the rotor to the cylinder and also of the stator to the frame construction. The gap between stator and rotor is generally understood to be that volume region between stator and rotor which, in the exactly radial direction, as based on the axis of rotation of the cylinder of the printing machine and of the rotor, is delimited on one side by the rotor and on the other side by the stator of the motor provided for the electric direct drive of the cylinder. In the simplest case, stator and rotor of the electric motor have a different length, measured in the axial direction, so that each straight line intersecting the axis of rotation of the cylinder and arranged perpendicular to this axis which, in the axial direction, intersects the shorter of the two parts comprising stator and rotor also intersects, in the axial direction, the longer of the parts comprising stator and rotor in any operating state of the electric motor, that is to say in any possible axial positioning of the cylinder. Further possible ways of keeping the gap between stator and rotor constant are provided by an ability to change the axial position of the rotor or of the stator relative to a component carrying the rotor or the stator, that is to say relative to the rotatable cylinder or relative to the housing of the electric motor connected to the frame construction. The housing of the electric motor that accommodates the stator is fixed to an outer ring of an antifriction bearing used to mount the cylinder in the frame construction.

In every case, output data of the electric direct drive, such as torque and angular acceleration, do not depend on the displacement of the cylinder in the direction of its axis of rotation. This also applies to designs in which the cylinder can be displaced at right angles to its axis of rotation in the frame construction by means of a linear guide.

According to a first embodiment, the rotor of the electric motor driving the cylinder directly is guided such that it can be displaced axially relative to the cylinder of the printing machine. The stator is at the same time arranged fixedly in the housing on the electric motor, which is attached to the frame construction of the printing machine directly or indirectly, in particular via a linear guide which permits an adjustment of the cylinder perpendicular to its axis. The rotor of the electric motor preferably has in its radially inner region a bush, in particular fabricated from nonferrous metal, which is mounted such that it can be axially displaced on the cylinder or a journal fixedly connected to the latter. Such a bush, in particular a nonferrous metal bush, can also be provided in embodiments in which the rotor is held non-displaceably on the cylinder or on a component fixedly connected to the latter. Irrespective of the extent to which an ability to displace the rotor axially relative to the cylinder is provided, the mounting of the rotor is configured in such a way that no rotation or a negligibly small rotation of the rotor relative to the cylinder is possible.

In the case of such a rotationally fixed mounting of the rotor to the cylinder or to a component connected rigidly to the latter, in order at the same time to permit an axial displacement of the rotor, in an advantageous refinement an antifriction mounting of the rotor is provided, as can also be used in principle in conventional products from linear technology. Likewise, however, a sliding mounting can also be implemented, which permits the ability of the rotor to be adjusted only in the axial direction relative to the cylinder. In each of the aforementioned cases, according to an advantageous development, a bearing is provided which fixes the axial position of the rotor relative to the housing of the electric motor, irrespective of the axial position of the cylinder. This bearing is preferably a grooved ball bearing, whose bearing rings are firmly connected to the rotor and to stator, respectively, of the electric motor.

According to an alternative refinement, the rotor of the electric motor is attached to the cylinder or a part fixed rigidly to the latter by means of at least one connecting element which is compliant in the axial direction but at the same time rigid in the circumferential direction. In this case, in its axially outer region in relation to the axis of rotation of the cylinder, the connecting element is connected to the rotor, and, in the axially inner region, is connected to the cylinder or the part fixed rigidly to the latter, in particular the journal. The compliant connecting element between the cylinder and the rotor preferably has a spring action in the axial direction. The forces acting on the rotor in the axial direction as a result are lower than the electromagnetic forces which likewise act in the axial direction and which occur during the operation of the electric motor. In this way, during an/or axial displacement of the cylinder, the rotor remains at least approximately centered relative to the stator. In no way is it possible for the rotor to be displaced beyond the stator in the axial direction. In a manner that is advantageous in terms of fabrication, the connecting element is connected by means of laser welding to the rotor and/or to the cylinder or a part fixed rigidly to the latter. Likewise, laser welding methods can be used during the fabrication of the connecting element itself.

Particularly vibration-damping properties of the connecting element can be achieved by the latter being fabricated from a composite material, in particular a sandwich composite of steel and plastic.

A further refinement of the invention provides for the stator being axially displaceably guided relative to a housing of the electric motor, which is connected to the frame construction of the printing machine. In this case, the rotor is connected rigidly to the cylinder of the printing machine. Between the ends of the stator longitudinally displaceably mounted in the housing of the electric motor and inner end faces of the housing located opposite the latter, there are preferably arranged elements with springy properties, in particular an O ring in each case. As long as the electric direct drive is not actuated, the stator is thus centered within the displacement travel available to it. When the electric motor is running, on the other hand, the axial position of the stator is primarily determined by the forces acting between stator and rotor. In this case, the stator is always oriented relative to the rotor in such a way that the geometry of the gap formed between stator and rotor is independent of the axial position of the cylinder. In order to position the stator particularly exactly relative to the rotor, an axial mounting can be provided which always holds the stator in an axially invariable position relative to the rotor, independent of the operation of the electric motor. An ability to displace the stator particularly easily in the longitudinal direction, that is to say in the axial direction, is provided in the event of an antifriction mounting of the stator in the housing of the electric motor. Appropriate linear guide elements preferably have an adjustable prestress, so that the compliance of the guidance of the stator in the circumferential direction can be minimized.

According to a development that can be combined with the exemplary embodiments explained above, the electric direct drive of the printing machine cylinder has an intrinsically safe brake, that to say one which is engaged in the event of power failure. Interacting friction linings of this brake are fixed to the rotor on one side and to the housing of the electric motor on the other side. If the brake is released, in particular by means of compressed air, the rotor is displaced in the axial direction in the housing of the electric motor. The displacement of the rotor in the opposite direction, and therefore engagement of the brake, is preferably carried out by means of spring force.

In the following text, a number of exemplary embodiments of the invention will be explained in more detail by using a drawing, in which:

DETAILED DESCRIPTION OF THE DRAWING

Figure 1:
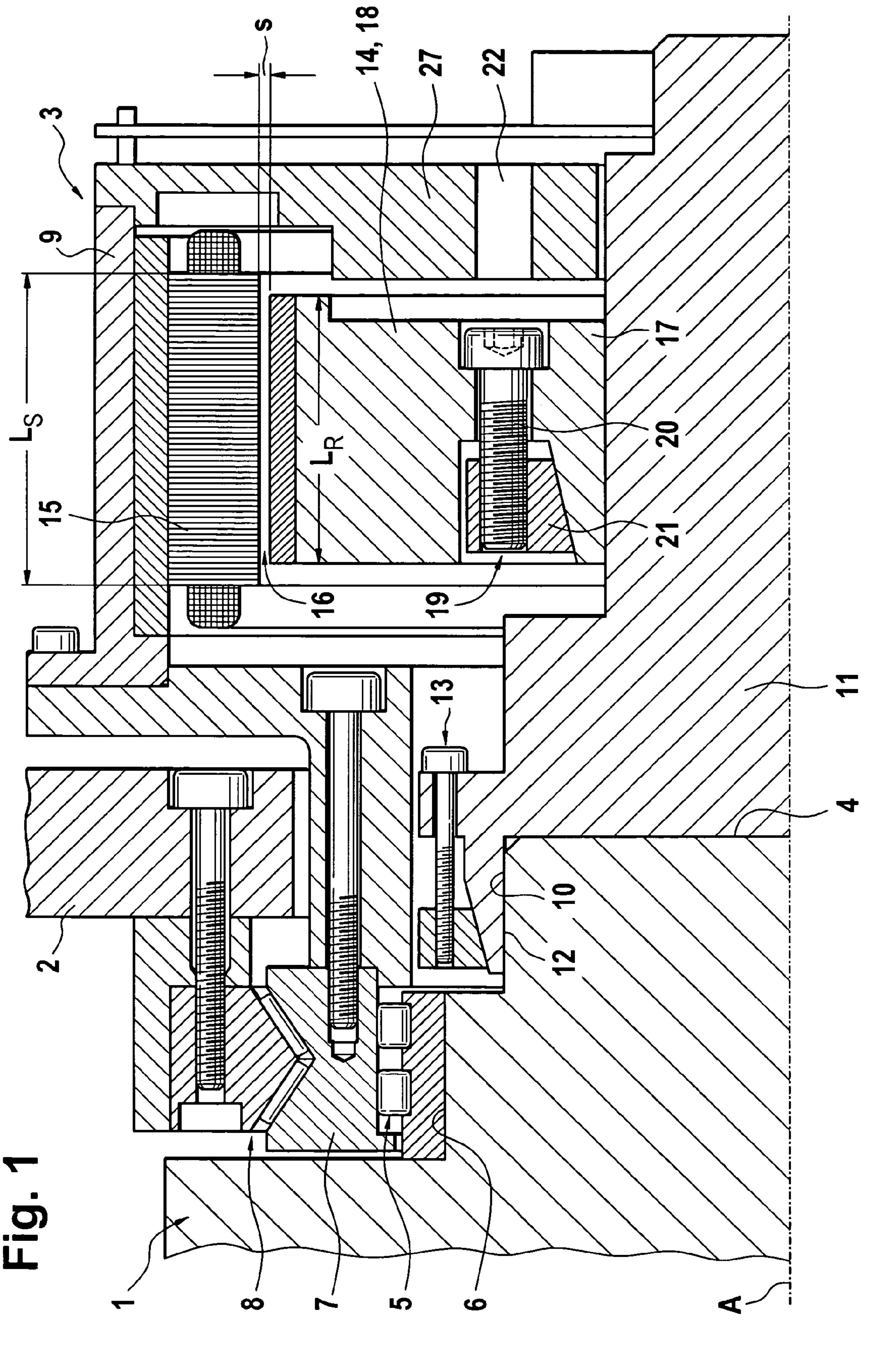
FIG. 1 shows a first exemplary embodiment of an electric direct drive of a printing machine cylinder.

FIGS. 1 to 9*a*, 9*b* show various exemplary embodiments of an electric direct drive of a printing machine, in each case in schematic view. Said printing machine has a cylinder 1 that can rotate about an axis A, is mounted in a frame construction 2 of the printing machine, not illustrated further, and is driven directly by means of an electric motor 3. Toward its end 4, the cylinder 1 is stepped repeatedly with a decreasing diameter, an antifriction bearing 5 permitting the rotation about the axis A being arranged on an annular section 6 of the cylinder 1. The outer ring 7 of the antifriction bearing 5, specifically a cylindrical roller bearing, is not fixed directly to the frame construction 2 but is connected to the latter via a linear guide 8 which permits an adjustment of the cylinder 1 at right angles to the axis of rotation A. The housing 9 of the electric motor 3 is also fixed to the outer ring 7. During each adjustment of the cylinder 1 at right angles to its axis of rotation A, the electric motor 3 is also adjusted automatically. Special equipment for readjusting the electric motor 3 is not required.

The end 4 of the cylinder 1 is adjoined by a journal 11, also designated a shaft journal extension, whose axis of rotation is identical with the axis A of the cylinder 1. In order to hold the journal 11 rigidly on the cylinder 1, an edge 12 of the journal 11 engages around an annular section 10 of the cylinder 1 adjoining the end 4. The journal 11, which is fixed to the cylinder 1 by means of a clamping device 13, bears the rotor 14 of the electric motor 3. On the other hand, the stator 15 of the electric motor 3, which is constructed as torque motor, is connected via the housing 9 to the outer ring 7 of the antifriction bearing 5. The entire assembly comprising the cylinder 1, the journal 11 and the rotor 14 can be displaced along the axis of rotation A.

This ability to be displaced axially is provided by the type of antifriction bearing 5. On the other hand, a special linear guide relating to the displacement of the cylinder 1 along the axis A is not provided.

As can be seen from FIG. 1, the axial length $L_R$ of the rotor 14 is less than the length $L_S$ of the stator 15 measured in the same direction. The lengths $L_R$, $L_S$ of the parts 14, 15 of the electric motor 3 are dimensioned such that the rotor 14 does not project beyond the stator 15 in the axial direction in any possible operating state. Thus, a gap 16 formed between rotor 14 and stator 15 remains constant under all possible conditions of the intended operational use of the electric motor 3. All the relevant characteristic variables of the electric motor 3, such as the speed-dependent relationship between current consumption and torque, are thus independent of the axial positioning of the cylinder 1. The gap width of the gap 16 is designated s; the length of the gap 16 is identical to the length $L_R$ of the rotor 14.

The rotor 14 has an inner part 17 directly surrounding the journal 11 and also an outer part 18, which are connected to each other by means of a clamping device 19. The clamping device 19, which fixes the rotor 14 rigidly to the journal 11, comprises a number of screws 20 and wedges 21, it being possible for the screws 20 to be actuated through openings 22 in the housing 9.

Figure 2:
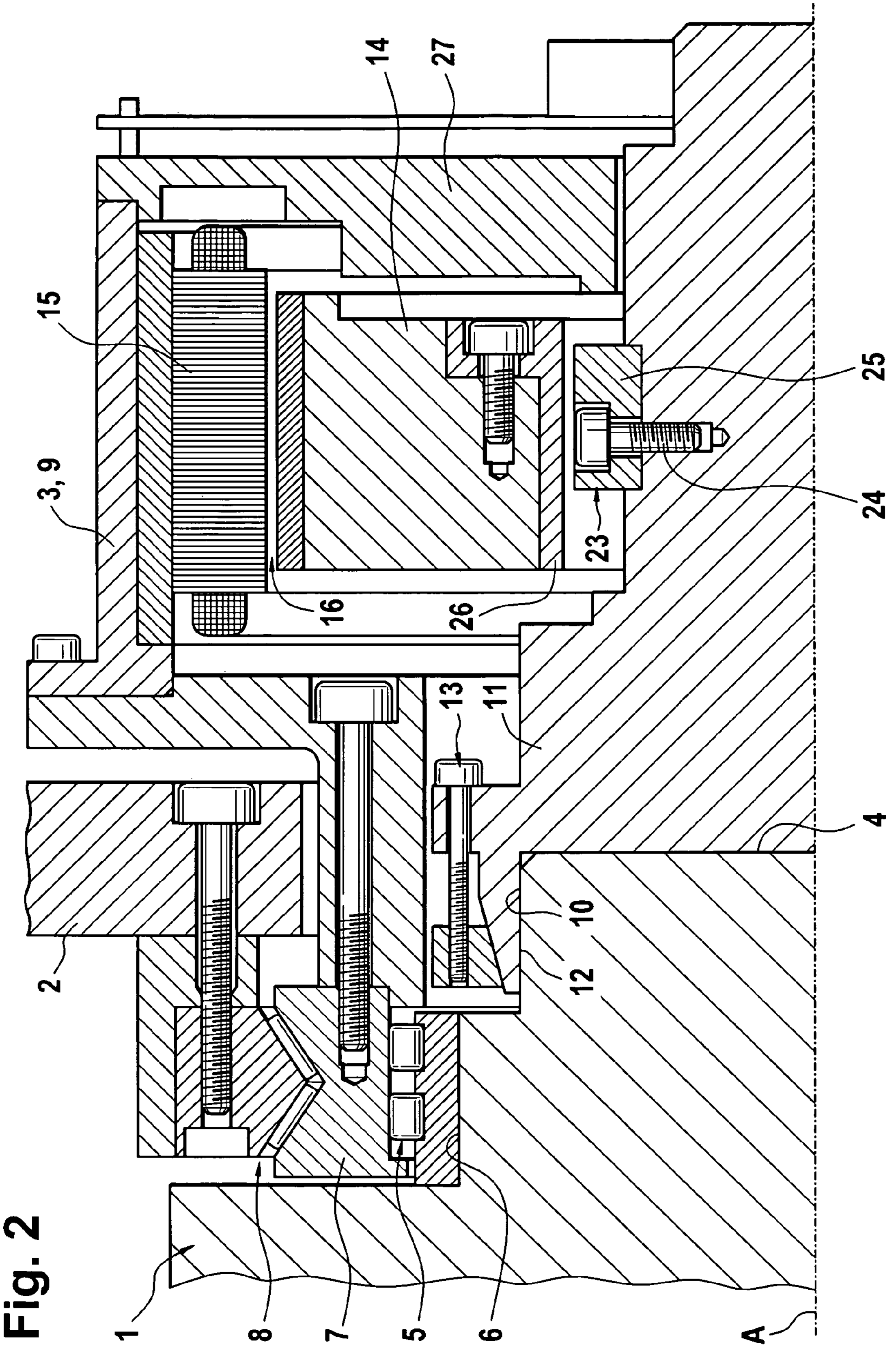
FIG. 2 shows a second exemplary embodiment of an electric direct drive of a printing machine cylinder, FIGS. 3*a* and *b* show details of an electric direct drive of a printing machine cylinder according to FIG. 2, FIGS. 4*a* and *b* show details of a third exemplary embodiment of an electric direct drive of a printing machine cylinder in views analogous to FIG. 3*a* and *b*.

The embodiment according to FIG. 2 likewise comprises a permanent-magnet excited synchronous motor as electric motor 3. The rotor 14 of this electric motor 3 is not fixed rigidly to the journal 11, however, but is mounted by means of a guide 23 such that it can be displaced in the direction of the axis of rotation A. The guide 23 comprises a grooved block 25 which is fixed to the journal 11 by means of a screw 24 and on which a bush 26 fabricated from brass and forming part of the rotor 14 slides. Despite an ability to be displaced axially, the rotor 14 is therefore guided on the journal 11 in a manner fixed against rotation, and therefore also fixed against rotation relative to the cylinder 1.

The forces occurring during operation of the electric motor 3 always orient the rotor 14 in the axial direction centrally with respect to the stator 15, as illustrated in FIG. 2. If an axial displacement movement of the cylinder 1, also designated a page register adjustment, is carried out, then the rotor 14 is displaced relative to the cylinder 1 and, in the process, maintains its absolute position, that is to say the position relative to the frame construction 2, at least approximately.

Both in the exemplary embodiment according to FIG. 1 and in the exemplary embodiment according to FIG. 2, a front end plate 27 of the housing 9 is used at the same time as a mounting aid during the assembly of the electric motor 3. If necessary, it is also possible to replace the stator 15 and/or the rotor 14 of the electric motor 3 without dismantling the electric motor 3 completely from printing machine.

Figure 3A:
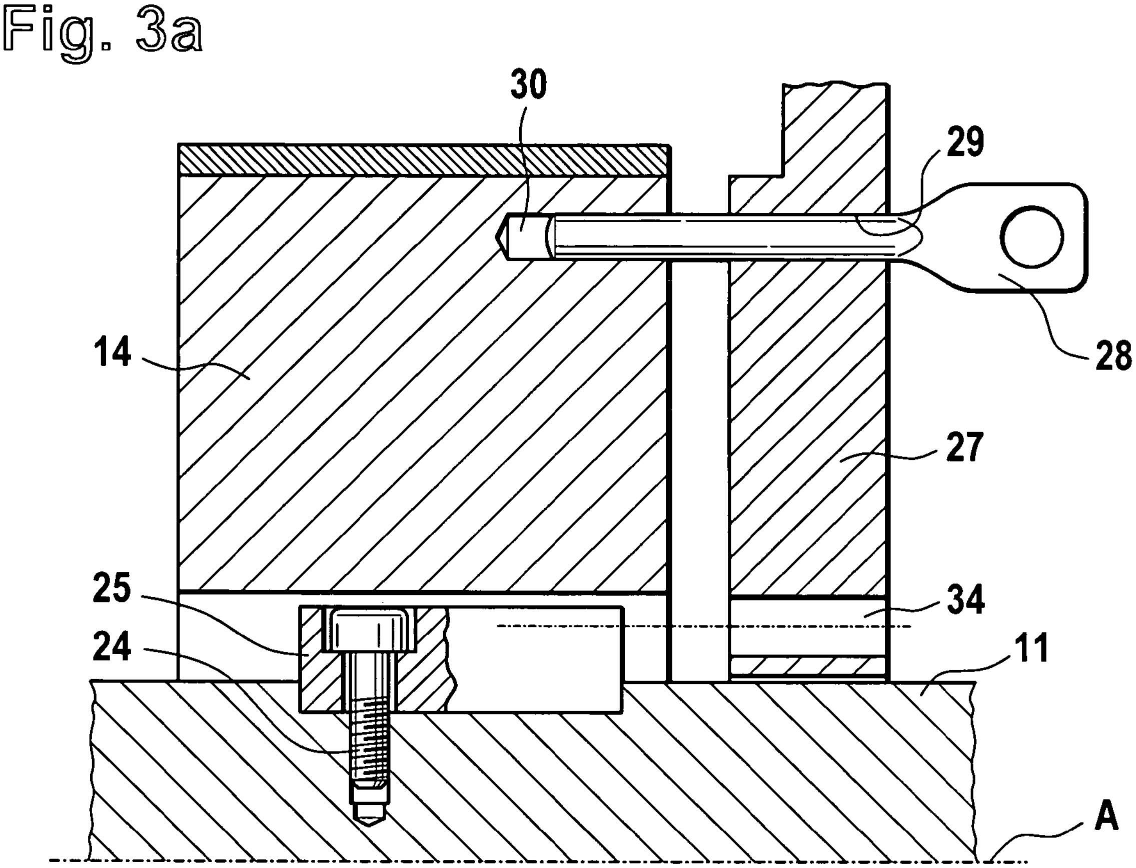
Figure 3B:
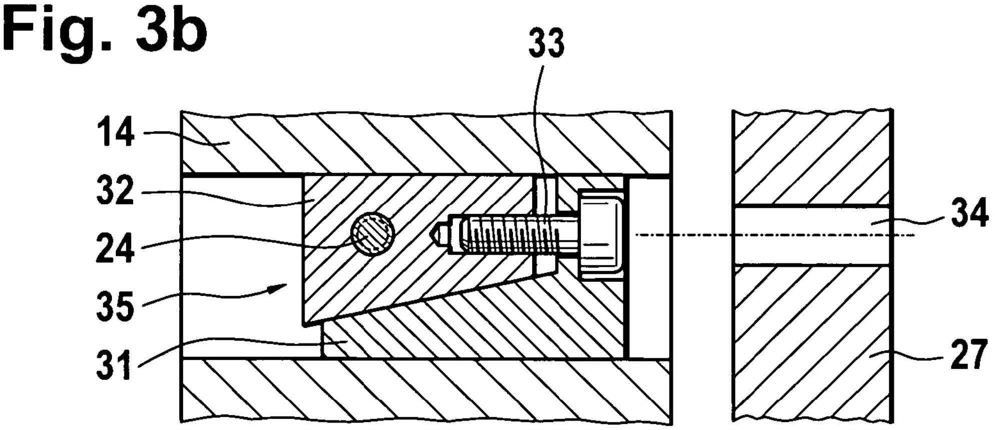

Details of the electric motor 3 according to FIG. 2 which are relevant during the mounting are illustrated in FIGS. 3*a* and 3*b*. A mounting pin 28 can be inserted through a hole 29 in the front plate 27 into a blind hole 30 in the rotor 14, so that the rotor 14 is positioned exactly in the circumferential direction relative to the journal 11. The grooved block 25 according to FIG. 3*b* is constructed in two parts, it being possible for two wedge pieces 31, 32 to be displaced with respect to each other by means of a screw 33 which can be actuated through a hole 34 in the front plate 27. Therefore, the play of the rotor 14 in the circumferential direction and the friction of the grooved block 25 in a groove 35 in the stator 14 can be adjusted.

Figure 4A:
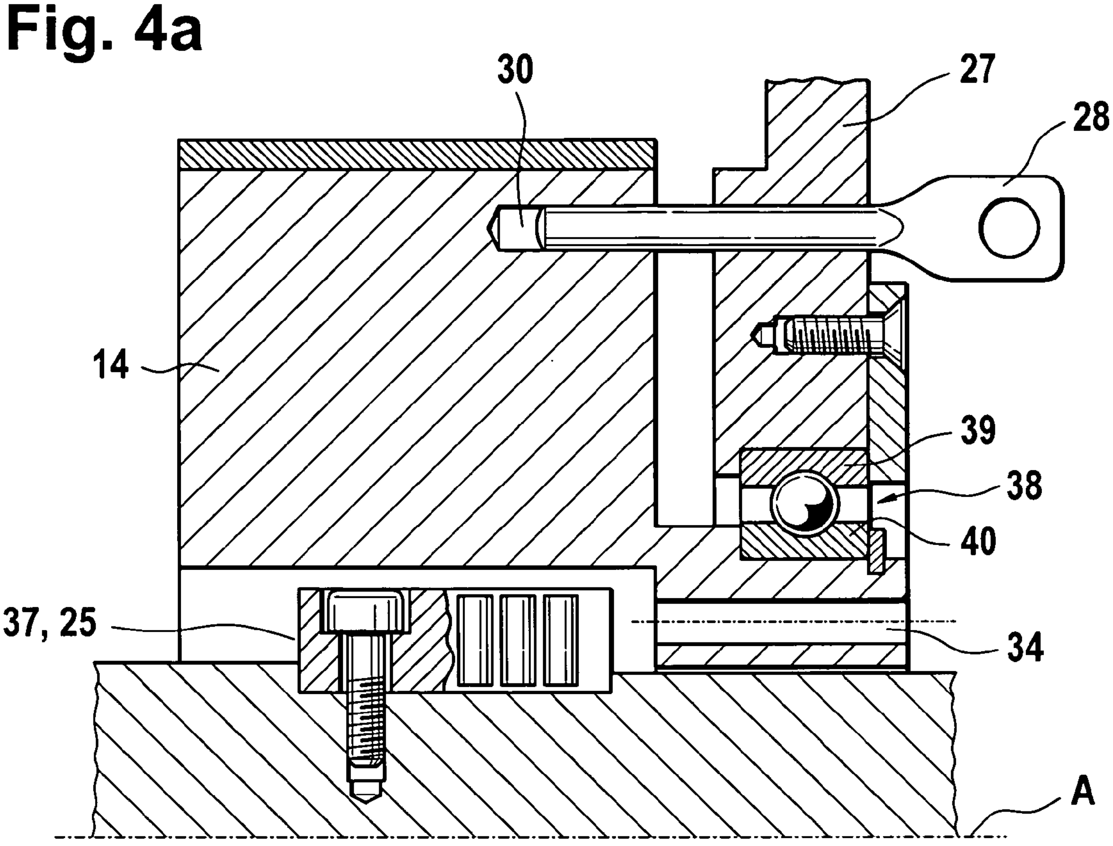
Figure 4B:
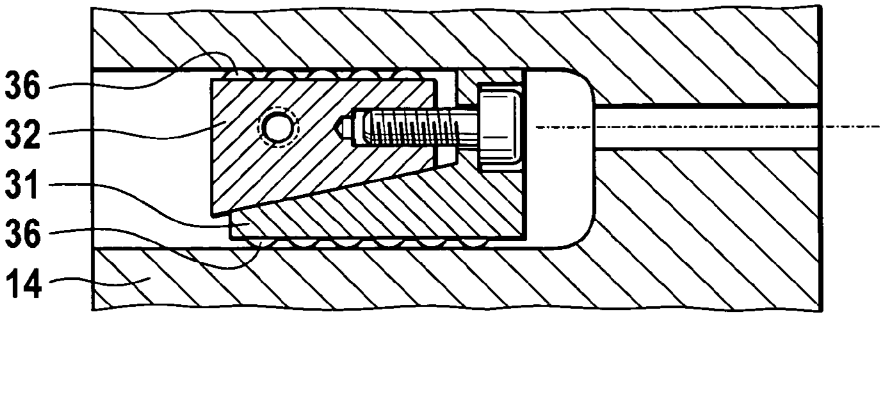

FIGS. 4*a* and 4*b* show a further developed variant of the mounting of the rotor 14 on the journal 11. Here, each of the wedge pieces 31, 32 of the grooved block 25 is fitted with antifriction elements 36, specifically needles, which forms what is known as a needle shoe 37. Like the grooved block 25 in the exemplary embodiment according to FIGS. 3*a, b,* the needle shoe 37 can also be prestressed as desired. By means of the antifriction mounting of the rotor 14, a mounting in the axial direction which is both play-free in the circumferential direction and also exhibits little friction and freedom from hysteresis is provided.

Any axial displacement of the rotor 14 relative to the frame construction 2 is prevented by a grooved ball bearing 38, whose bearing rings 39, 40 are firmly connected on one side to the front plate 27 and on the other side to the rotor 14.

Figure 5:
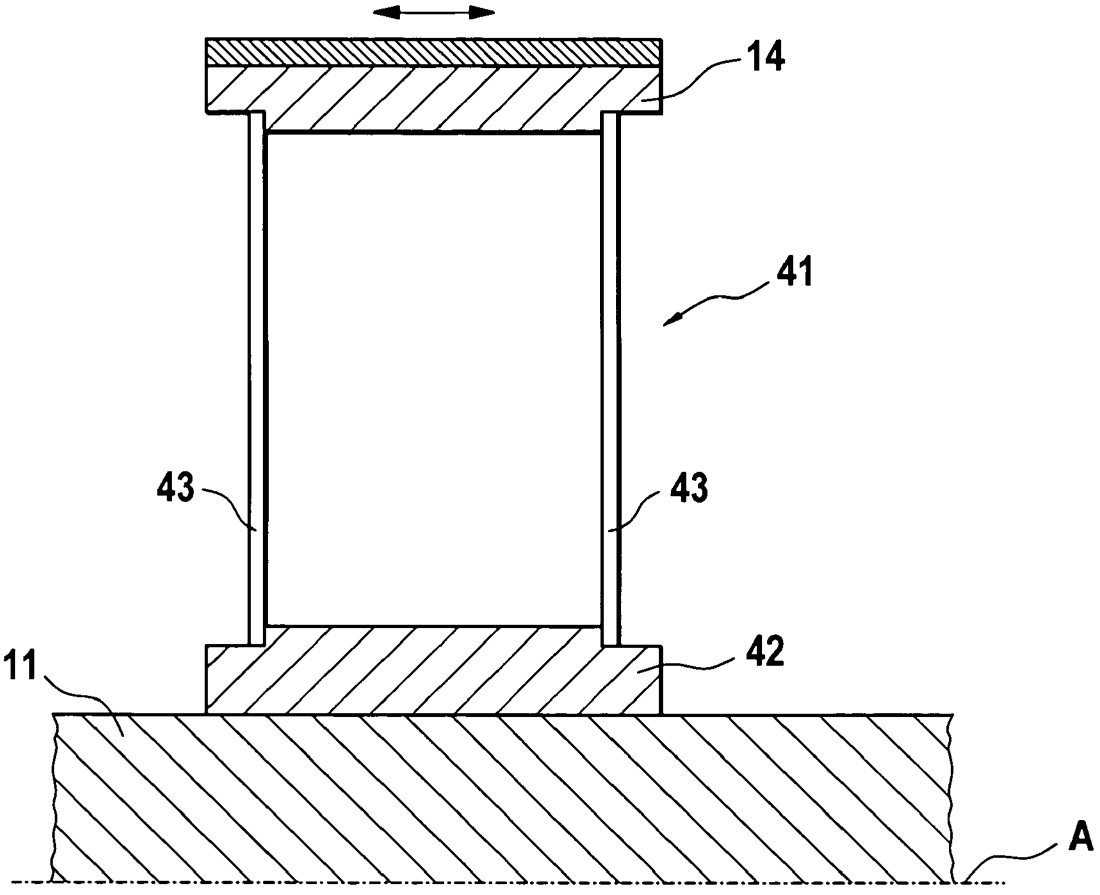
FIG. 5 shows a fourth exemplary embodiment of an electric direct drive of a printing machine cylinder.

In the exemplary embodiment according to FIG. 5, the rotor 14 is not held directly on the journal 11 but coupled to the latter by means of a flexible connecting element 41, which is connected on one side to the rotor 14 and on the other side to a hub 42 arranged fixedly on the journal 11. The connecting element 41 comprises a plurality of composite plates 43 arranged in the axially front and in the axially rear region of the rotor 14 and the hub 42 held without play on the journal 11 by a clamping connection. Each composite plate 43 is constructed as a metal sheet/plastic/metal sheet sandwich component and connected cohesively via laser welding both to the rotor 14, which surrounds the connecting element 41, and to the hub 42, which is arranged radially inside the connecting element 41. The connecting element 41 has elastically compliant properties only in the direction of the axis of rotation A, so that the rotor 14 is mounted rigidly in the circumferential direction by means of the connecting element 41 but spring-mounted in the axial direction. In a manner analogous to the rotor 14 according to FIG. 2, which is displaceably mounted by means of the bush 26, the spring-mounted rotor 14 according to FIG. 5 is also positioned automatically relative to the stator 15, solely on account of the electromagnetic forces occurring during the operation of the electric motor 3.

Figure 6:
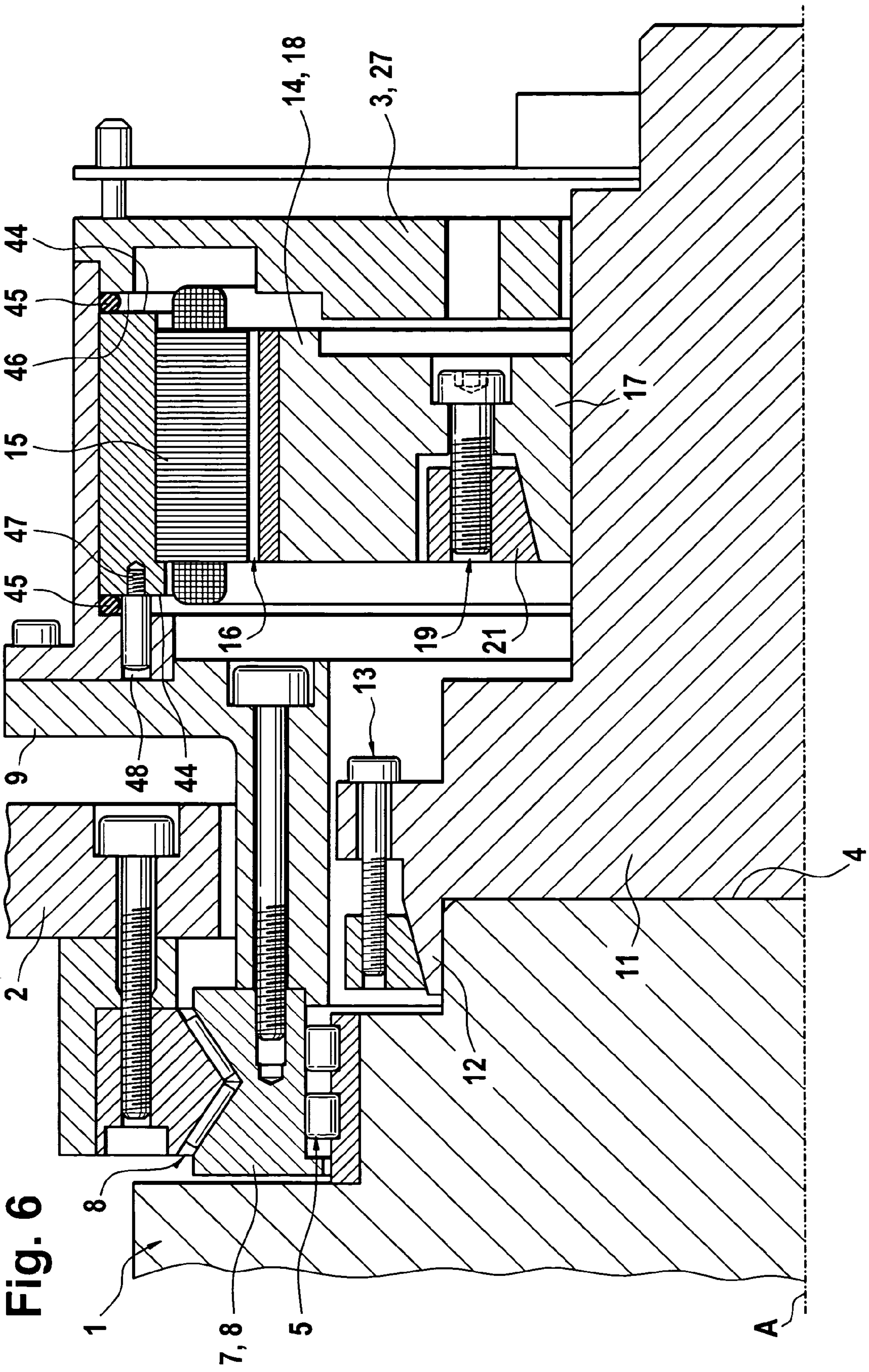
FIG. 6 shows a fifth exemplary embodiment of an electric direct drive of a printing machine cylinder, FIGS. 7*a* and *b* show a sixth exemplary embodiment of an electric direct drive of a printing machine cylinder.

The exemplary embodiment according to FIG. 6 differs from the exemplary embodiments explained above essentially in the fact that the stator 15 is mounted in the housing 9 of the electric motor 3 such that it can be displaced in the axial direction, while the rotor 14 is connected rigidly to the journal 11 and therefore also to the cylinder 1, for example a plate, rubber-covered, impression or transfer cylinder. In order to center the stator 15 within the displacement travel that is available when the electric motor 3 is switched off, in each case an O ring 45 is arranged at the two ends 44 of the stator 15, bearing on an inner end face 46 of the housing 9. Instead of an O ring 45, for example a spiral spring or a leaf spring can also be provided. In the event of a lateral register adjustment, that is to say an axial displacement of the cylinder 1 and therefore also of the rotor 14, the compliance of the O rings 45 is sufficient to displace the stator 15 as well by means of the electromagnetic forces that occur. Rotation of the stator 15 relative to the housing 9 is prevented by a pin 47 which is screwed into the stator 15 and which penetrates a hole 48 in the housing 9. Although, as opposed to the exemplary embodiments according to FIGS. 1 and 2, the stator length $L_S$ and the rotor length $L_R$ are identical, the gap 16 between rotor 14 and stator 15 also remains constant in every operating state in the exemplary embodiment according to FIG. 6.

Figure 7A:
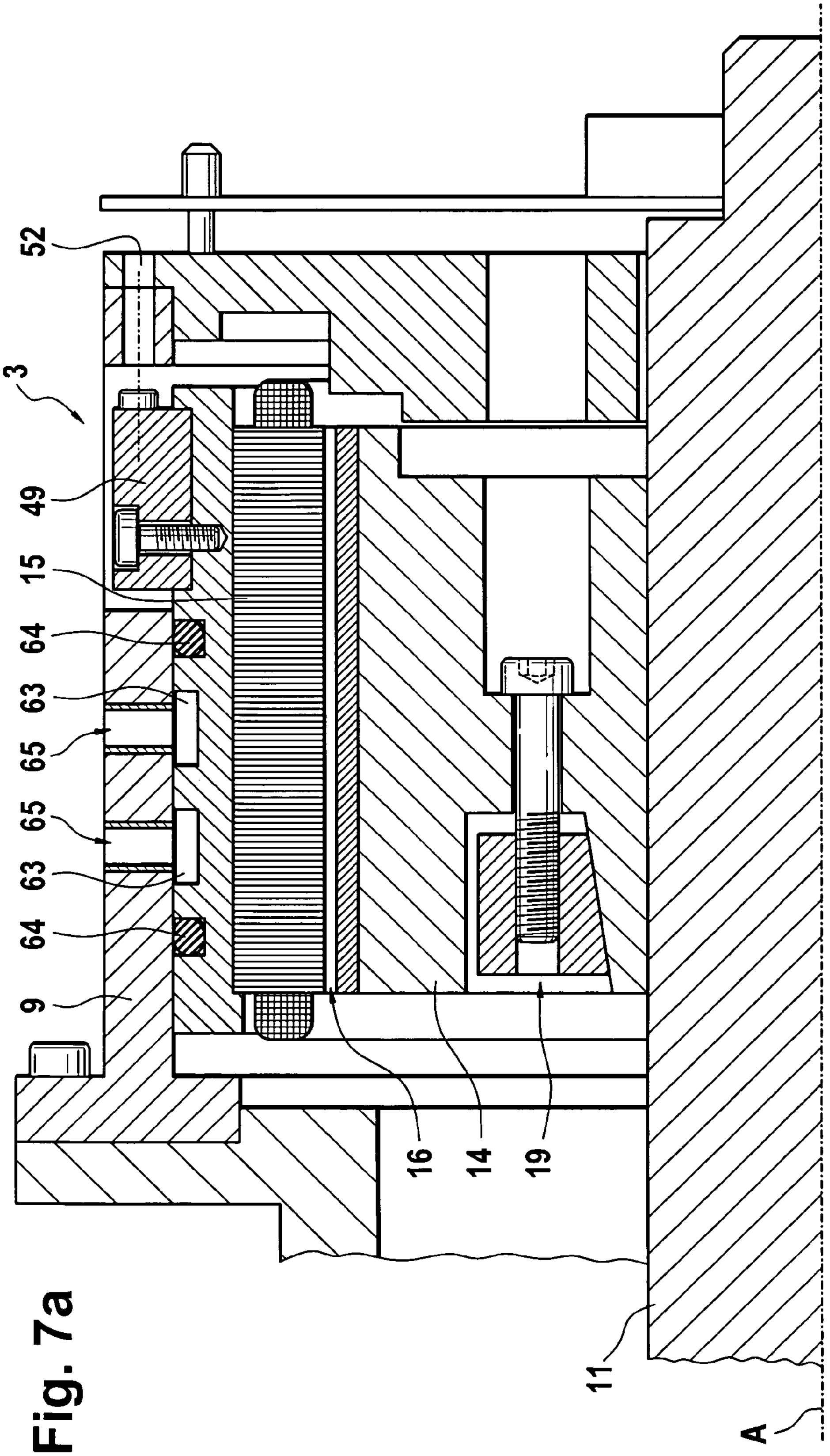
Figure 7B:
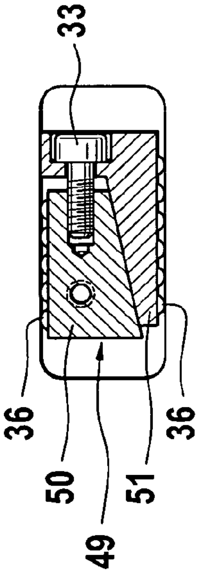

FIGS. 7*a* and 7*b* show a further development of the exemplary embodiment according to FIG. 6, the stator 15 being longitudinally displaceably guided in the housing 9 by means of an adjustable needle shoe 49. In a manner comparable with the exemplary embodiment according to FIG. 4*a, b,* the needle shoe 49 according to FIG. 7*a, b* also has two wedge pieces 50, 51 that can be displaced with respect to each other, so that the play of the stator 15 in the circumferential direction is adjustable, in particular mounting of the stator 15 with prestress can be set. Even with the electric motor 3 mounted completely, the prestress of the needle shoe 49 can be changed by means of a tool, not illustrated, which can be applied to the needle shoe 49 through a hole 52 in the housing 9. Furthermore, in a manner not illustrated, a mounting, in particular an antifriction mounting, can be provided between the rotor 14 and the stator 15, by means of which the axial position of the stator 15 relative to the rotor 14 is fixed invariably in a manner similar to that in the exemplary embodiment according to FIG. 4*a*.

In order to carry away heat produced during the operation of the electric motor 3, on the circumference of the stator 15 there are cooling ducts 63 through which a cooling medium, in particular water, can flow and which adjoin the housing 9 directly, seals 64 for sealing off with respect to the housing 9 being provided. The cooling medium is led into the cooling ducts 63 through a hole 65 in the housing 9.

Figure 8:
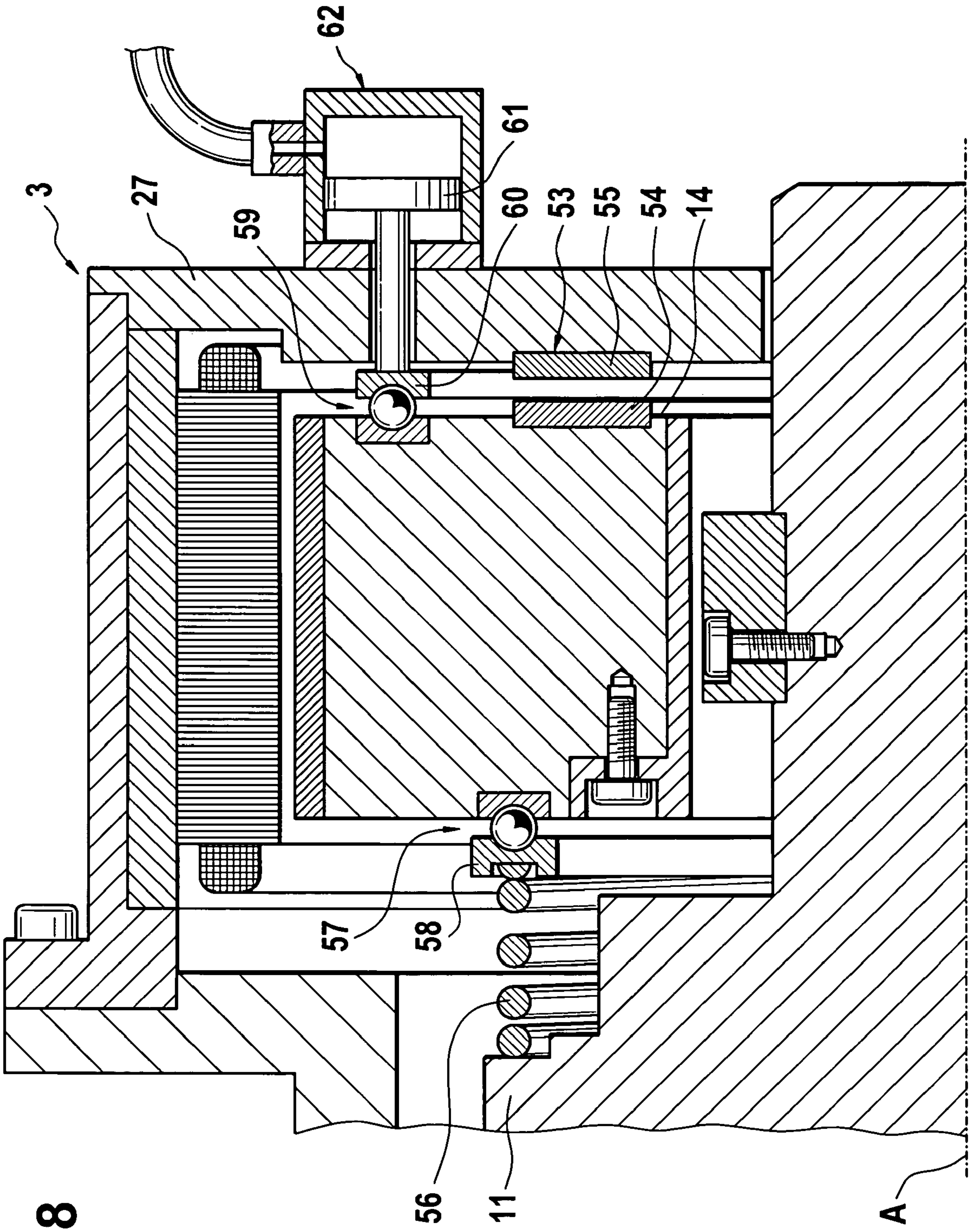
FIG. 8 shows a seventh exemplary embodiment of an electric direct drive of a printing machine cylinder, FIGS. 9*a* and *b* show an eighth exemplary embodiment of an electric direct drive of a printing machine cylinder.

A further development of an electric direct drive in a printing machine is illustrated in FIG. 8, an intrinsically safe brake 53 being integrated into the electric motor 3. The rotor 14 of the electric motor 3 is mounted by means of a sliding mounting such that it can be displaced on the journal 11 connected to the cylinder 1, in a manner similar to that in the exemplary embodiment according to FIG. 2. On the end of the rotor 14 facing away from the cylinder 1 there is a first brake lining 54, which interacts with a second brake lining 55 fixed to the inside of the front plate 27. In the absence of a supply of energy, the brake linings 54, 55 are pressed against each other by means of a compression spring 56 which is formed as a helical spring and which surrounds the journal 11. In a departure from the illustration, the compression spring 56 can also be formed as a disc spring, for example. In order to transmit a force from the compression spring 56 to the rotor 14 and therefore to the brake linings 54, 55, an antifriction bearing 57 used for rotational decoupling is arranged between the compression spring 56 and the rotor 14, the bearing ring 58 of the antifriction bearing 57 that is arranged on the side of the compression spring 56 being mounted in the housing 9 such that it can be displaced axially but not rotated.

A further antifriction bearing 59 transmits a force when the brake 53 is released and is arranged between the front plate 27 of the housing 9 and the rotor 14. In this case, the bearing shell 60 of the antifriction bearing 59, which is arranged on the side of the front plate 27, is not connected rigidly to the front plate 27 but is coupled to a thrust element 61 of an actuator 62 acting in the axial direction. In the exemplary embodiment illustrated, the actuator 62 is a compressed-air actuated actuating element but can also be constructed as an electrically actuated or hydraulic actuating element, for example. In any case, releasing the brake 53 is possible only when energy is supplied to the actuator 62.

Figure 9B:
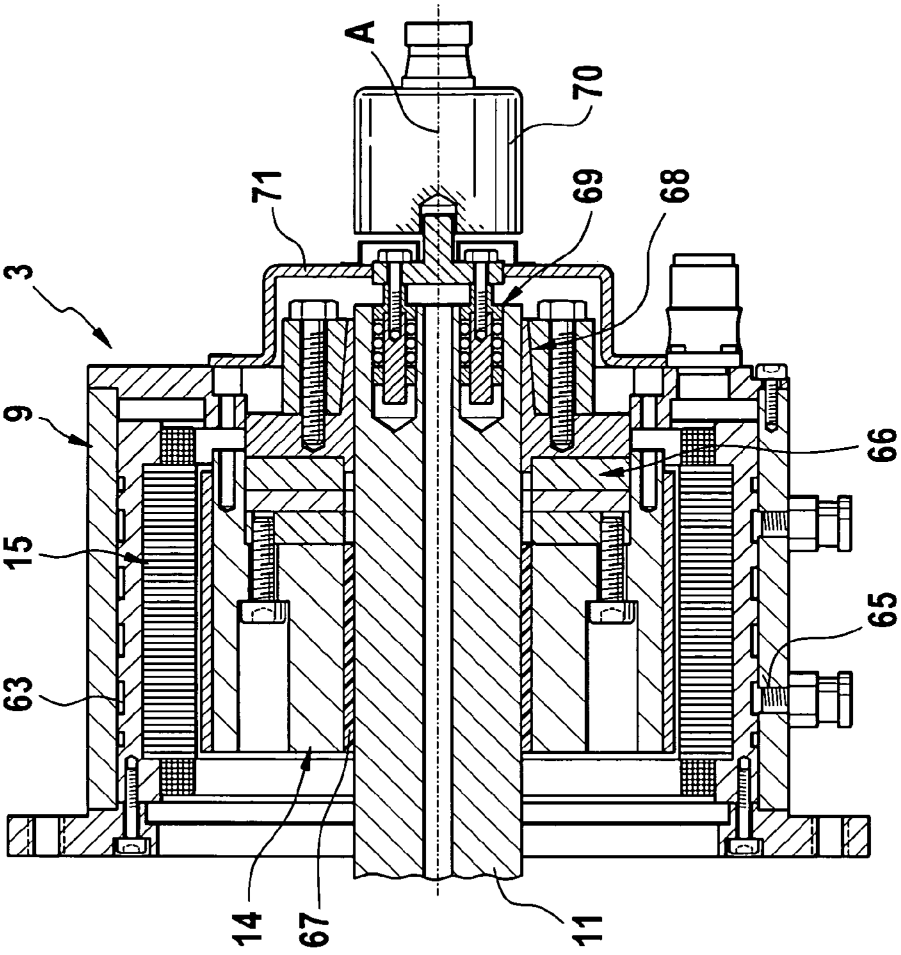
Figure 9A:
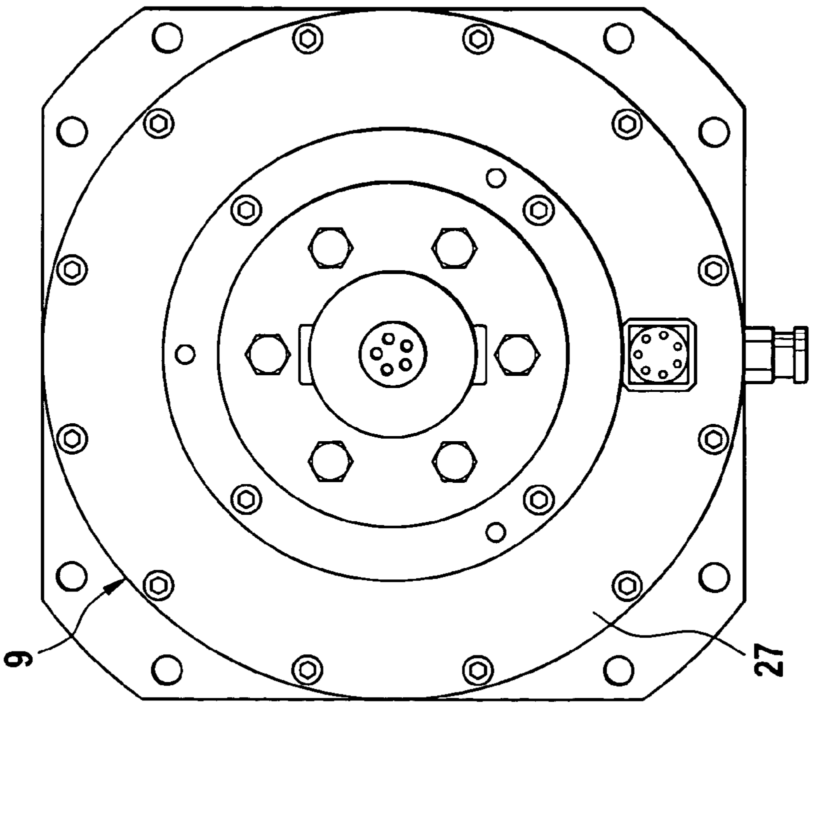

FIGS. 9*a* and 9*b* show an electric direct drive of a printing machine in which they stator 15 of the electric motor 3 is arranged fixedly in its housing 9, while the rotor 14 is guided by means of a compensating coupling 66 such that it is fixed against rotation but can be displaced axially on the journal 11 connected to the cylinder 1. In order to mount the rotor 14 on the journal 11, a sliding bush 67 is provided. The axial position of the rotor 14 relative to the housing 9 is also always constant in the event of an axial displacement, that is to say an oscillating movement of the journal 11. The compensating coupling 66 is arranged between the rotor 14 and a clamping set 68 fixed to the journal 11.

By means of a further compensating element 69, which is located on the end of the journal 11, the rotational movement of the journal 11 is transmitted to a rotary encoder 70, which is arranged outside the housing 9, with decoupling of axial movement components. The rotary encoder 70 is connected to the rest of the housing 9 via a housing cap 71.

The invention claimed is:

1. A device for driving a cylinder (1) of a printing machine, having an electric motor (3) with a rotor (14) arranged coaxially with respect to the cylinder (1) and is connected so as to rotate with the cylinder, and a stator (15) is held on a frame construction (2) in which the cylinder (1) is mounted such that it can be displaced axially, the rotor (14) and the stator (15) being dimensioned and coupled to the cylinder (1) and the frame construction (2), respectively, so that during any axial displacement of the cylinder (1) possible during the operation of the printing machine, the gap (16) formed between stator (15) and rotor (14) remains constant both with regard to gap width (s) and with regard to gap length, wherein a housing (9) of the electric motor (3) that accommodates the stator (15) is fixed to an outer ring (7) of an antifriction bearing (5) used to mount the cylinder (1) in the frame construction (2) wherein the rotor (14) is guided such that it can be displaced axially relative to the cylinder (1).

2. A device of claim 1, wherein a linear guide (8), by means of which the antifriction bearing (5) used to mount the cylinder (1) can be displaced in the frame construction (2) at right angles to an axis of rotation (A) of the cylinder (1).

3. A device of claim 2, wherein an intrinsically safe brake (53) for braking the assembly comprising cylinder (1) and rotor (14).

4. A device of claim 1, wherein the rotor (14) has in its radially inner region a bush (26) which is mounted such that it can be axially displaced on the cylinder (1) or a journal (11) fixedly connected to the cylinder.

5. A device of claim 4, wherein the bush (26) is fabricated from nonferrous metal.

6. A device of claim 1, wherein the rotor (14) is longitudinally displaceably guided relative to the cylinder (1) by means of an antifriction mounting (36).

7. A device of claim 1, wherein a bearing (38) which fixes an axial position of the rotor (14) relative to the housing (9) of the electric motor (3), irrespective of the axial positioning of the cylinder (1).

8. A device of claim 7, wherein the bearing (38) provided is a grooved ball bearing, whose bearing rings (39, 40) are firmly connected to the rotor (14) and the stator (15), respectively, of the electric motor (3).

9. A device of claim 1, wherein the rotor (14) is attached to the cylinder (1) by means of at least one connecting element (41) which is compliant in an axial direction but at the same time rigid in the circumferential direction and which on one side, in a radially inner region, is connected to the cylinder (1) or a part (11, 42) fixed rigidly to the cylinder, and on another side, in a radially outer region, is connected to the rotor (14).

10. A device of claim 9, wherein the connecting element (41) is springy in the axial direction.

11. A device of claim 9, wherein the connecting element (41) is fabricated by means of laser welding and/or connected to the rotor (14) and/or to the cylinder (1) or a part (11, 42) fixed rigidly to the cylinder.

12. A device of claim 9, wherein the connecting element (41) is fabricated from a composite material.

13. A device of claim 12, wherein the composite material of the connecting element (41) comprises a metallic material and a polymer material.

* * * * *